(12) United States Patent
Gordon et al.

(10) Patent No.: US 9,052,199 B2
(45) Date of Patent: Jun. 9, 2015

(54) SYSTEM AND METHOD FOR INDICATING USER LOCATION AND FACING DIRECTION ON A DIGITAL MAP

(71) Applicant: GOOGLE INC., Mountain View, CA (US)

(72) Inventors: David Robert Gordon, Yoyogi (JP); Zhou Bailiang, Balgowlah (AU)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/842,254

(22) Filed: Mar. 15, 2013

(65) Prior Publication Data

US 2014/0278067 A1     Sep. 18, 2014

(51) Int. Cl.
| | | |
|---|---|---|
| *G01C 21/00* | (2006.01) | |
| *G01C 21/36* | (2006.01) | |
| *G09B 29/00* | (2006.01) | |
| *G09B 29/10* | (2006.01) | |
| *G01C 17/02* | (2006.01) | |

(52) U.S. Cl.
CPC ............... *G01C 21/00* (2013.01); *G01C 17/02* (2013.01); *G01C 21/367* (2013.01); *G09B 29/007* (2013.01); *G09B 29/106* (2013.01)

(58) Field of Classification Search
CPC ...... G01C 17/02; G01C 21/367; G01C 21/00; G09B 29/106; G09B 29/007
USPC ......................................................... 701/457
See application file for complete search history.

(56) References Cited

U.S. PATENT DOCUMENTS

| | | | |
|---|---|---|---|
| 7,925,982 B2 | 4/2011 | Parker et al. | |
| 2005/0267681 A1* | 12/2005 | Yato | 701/210 |
| 2010/0087230 A1* | 4/2010 | Peh et al. | 455/566 |
| 2012/0303268 A1 | 11/2012 | Su et al. | |

OTHER PUBLICATIONS

Download.com, "Bing Versus Google Maps: Voice Navigation Compared, " (2010). Retrieved from the Internet on Jul. 22, 2013: URL:http://download.cnet.com/8301-2007_4-20005154-12.html.
Google search, "Maps Navigation Icon," (2013). Retrieved from the Internet on Jul. 22, 2013: URL:https://www.google.com/search?q=maps+navigation+icon&hl=en&safe=off&client=firefox-a&rls=org.mozilla:en-US:official&tbm=isch&source=lnms&sa=X&ei=0Ug2UfnPL6TS2AW9rlG4AQ&ved=0CAcQ_AUoAQ&biw=1680&bih=962#imgrc=.

* cited by examiner

*Primary Examiner* — Mary Cheung
*Assistant Examiner* — Yuen Wong
(74) *Attorney, Agent, or Firm* — Marshall, Gerstein & Borun LLP

(57) ABSTRACT

A system and method may indicate a user location and compass direction on a digital map. Map data may be requested from a remote mapping system server using a client computing device. The request may include a geographic area. The map data may be received from the remote mapping system at the client computing device in response to the request. The client computing device may then determine a user location and a user compass direction at the client computing device and render both the user location and the user compass direction within a digital map of the geographic area at the client computing device.

20 Claims, 4 Drawing Sheets

SYSTEM AND METHOD FOR INDICATING USER LOCATION AND FACING DIRECTION ON A DIGITAL MAP

FIELD OF THE DISCLOSURE

The present disclosure relates to digital maps and, more particularly, to providing an indication of user location and facing direction as part of digital maps on a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of computing devices, including many portable devices, support software applications that display digital maps ("mapping applications"). For example, mapping applications may run on laptop and tablet computers, mobile phones, car navigation systems, hand-held global positioning system (GPS) units, etc.

In general, a mapping application can display various types of geographic data including topographical data, street data, urban transit information, and traffic data on a map. Further, the geographic data may be schematic or based on photography, such as satellite imagery. In addition to displaying the geographic data, the mapping application may display the current location of a user operating the computing device and/or a compass direction that the user is facing on the map. However, in many cases, the user's location and facing direction are rendered as one visual indicator (e.g., a chevron icon), which creates imbalance and causes confusion in the visualization. In other cases, the user's facing direction is not visualized or visualized only in a compass mode.

SUMMARY

A mapping software module operating on a computing device displays an interactive digital map of a geographic region. The mapping software module also displays a user's current location and a direction that the user is facing on the digital map. The user's location and facing direction are rendered as separate but related visual indicators to provide a better and more intuitive visualization.

In one embodiment, a method may indicate a user location and compass direction on a digital map. Map data may be requested from a remote mapping system server using a client computing device. The request may include a geographic area. The map data may be received from the remote mapping system at the client computing device in response to the request. The client computing device may then determine a user location and a user compass direction at the client computing device and render both the user location and the user compass direction within a digital map of the geographic area at the client computing device.

In another embodiment, a computer system may indicate user location and compass direction on a digital map. The system may comprise a client computing device, a mapping server, and a location server. The client computing device may include a memory storing instructions for execution on a client computing device processor. The instructions may include a mapping module to send a mapping data request indicating a geographic area, a location module to send a location request determine a current location of the client computing device, and a compass module to determine a compass direction of the client computing device. The mapping server may include a memory storing instructions for execution on a mapping server processor to receive the mapping data request from the client computing device, and send mapping data to the client computing device in response to the mapping data request. The location server may include a memory storing instructions for execution on a location server processor to receive the location request, retrieve location data corresponding to a location of the client computing device, and send the location to the client computing device. The client computing device mapping module may further include instructions for execution on the client computing device processor to receive the map data from the mapping server in response to the mapping data request, receive the location from the location server in response to the location request, and render a digital map of the geographic area at the client computing device. The rendered digital map may include both the client computing device location and the client computing device compass direction within a digital map of the geographic area.

In another embodiment, a non-transitory computer-readable medium may have instructions stored thereon for indicating a client computing device location and compass direction on a digital map. The instructions may comprise requesting map data from a remote mapping system server using a client computing device. The request may include a geographic area. The instructions may also include receiving the map data from the remote mapping system at the client computing device in response to the request. Further, the instructions may include determining a user location and a user compass direction at the client computing device and rendering both the user location and the user compass direction within a digital map of the geographic area at the client computing device.

In another embodiment, a system may include means for indicating a client computing device location and compass direction on a digital map. A first means may request map data from a remote mapping system server using a client computing device. The request may include a geographic area. A second means may receive the map data from the remote mapping system at the client computing device in response to the request. A third means may determine a user location and a user compass direction at the client computing device and render both the user location and the user compass direction within a digital map of the geographic area at the client computing device.

The features and advantages described in this summary and the following detailed description are not all-inclusive. Many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
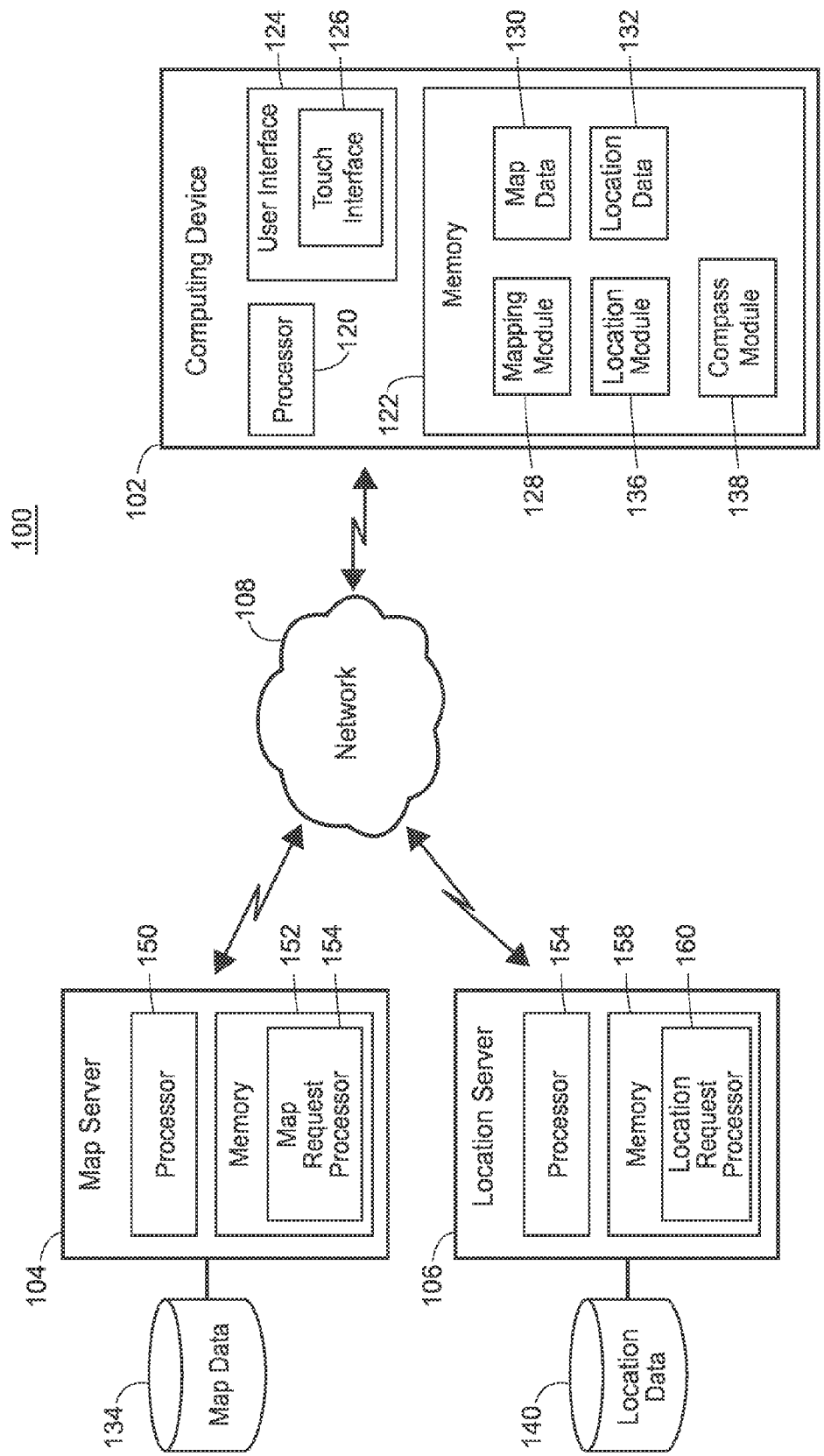
FIG. 1 is a block diagram of a system for displaying a user's location and facing direction on a map being displayed on a computing device.

Referring first to FIG. 1, a system 100 includes a computing device 102 coupled to a map server 104 and a location server 106 via a communication network 108. The computing device 102 can be, for example, a smartphone, a tablet computer, a laptop computer, a navigation device mounted in a vehicle, etc. The network 108 in general can include wired and/or wireless communication links and may include, for example, a wide area network (WAN) such as the Internet, a local area network (LAN), a cellular telephone network, or any other suitable types of network.

In the embodiment shown in FIG. 1, the computing device 102 includes a processor 120, a computer-readable memory 122, and a user interface 124 including a touch interface 126. In various implementations, the touch interface 126 can include a touchpad over which the user moves his fingers while looking at a separately provided screen, a touchscreen where the user places his fingers directly over the image being manipulated or over a displayed control being activated (e.g. a displayed keyboard), etc. The processor 120 may include a central processing unit (CPU), for example. More generally, the portable computing device 102 can include one or more processors and, if desired, one or more graphics processing units (GPUs) as well as other processing units. The memory 122 is a computer-readable non-transitory storage device that may include both persistent (e.g., a hard disk, a flash drive) and non-persistent (e.g., RAM) memory components. The memory 122 stores instructions executable on the processor 120 that make up a mapping software module 128. The memory 122 also stores map data 130 and location data 132 on which the mapping module 128 operates. In various implementations, the computing device 102 can include additional components, such as one or more wired and/or wireless network interfaces, peripheral devices such as mouse, etc.

In operation, the mapping module 128 generates requests for map data in accordance with how the user positions the viewport using pan, zoom, and other controls. A request for map data can specify, for example, the geographic area for which the computing device 102 will display a digital map, the zoom level, and the desired layers of additional information (e.g., traffic, weather, satellite imagery, etc.). The computing device 102 transmits the requests to the map server 104. In response, the map server 104 retrieves map data from a map database 134 and provides the map data to the computing device 102 via the network 108 (in the form of one or a series of messages). The computing device 102 then stores the received map data in the memory 122 as the map data 130.

The mapping software module 128 according to various implementations operates as a separately executable software application, a plugin that extends the functionality of another software application such as a web browser, an application programming interface (API) that may be invoked by a software application, etc. The instructions that make up the mapping module 128 may be compiled and executable on the processor 120 directly, or not compiled and interpreted by the processor 120 at runtime.

Depending on the implementation, the map data 130 may be in a raster format, such as Portable Network Graphics (PNG), a vector graphics format (based on mathematical descriptions of geometric shapes), or any other suitable format. The map data 130 in some cases is divided into map tiles, or portions of a digital map having a certain fixed size, such as 256 by 256 pixels. The mapping software module 128 renders or assembles a digital map based on the map data and causes the digital map to be displayed via the user interface 124. When the map data 130 is already rasterized, the mapping module 128 generates the digital map by selecting and combining the proper rasterized tiles. However, if the map data 130 is in a vector graphics format, the mapping module 128 first interprets the descriptions of various shapes and applies specified textures to the shapes to generate the corresponding raster images. The mapping software module 128 also adjusts the displayed digital map and requests new map data, when necessary, in response to user input received via the user interface 124. More specifically, the user may change the zoom level, pan across the map, and otherwise interact with the map.

When received in a vector graphics format, the map data 130 may specify individual map elements representing such physical entities as buildings, roads, bodies of water, and other natural and artificial objects visible outside (e.g., from above or at a street level). The map data 130 can also include text-based label data (e.g., labels for displaying street names, names of landmarks, etc.) as well as metadata that include additional information about the physical entity. In a raster format, map elements typically are embedded into the same image of a digital map. In general, map data may be used to generate two-dimensional (2D) images or three-dimensional (3D) images, and may include schematic data, photographic images, or both.

In addition to displaying the digital map, the mapping software module 128 may show the user's location and the user's facing direction on the map in order to provide visualization of the user's movements in real-time. To acquire the user's location, the mapping software module 128 may execute a location module 136 to send a location request (e.g., a GPS beacon) to determine the current location of the user based on various location detection methods (e.g., GPS, triangulation of cell towers or Wi-Fi networks, etc.) To acquire the user's facing direction, the mapping software module 128 may execute a compass module 138 to compute a compass direction that the computing device 102 (and by extension, the user holding the computing device 102) is facing based on one or more sensors (e.g., a magnetometer, an accelerometer, etc.) internal to the computing device 102.

In some implementations, when determining the user's location in the geographic area displayed on the map, the location module 136 may communicate with the location server 106 via the network 108 to retrieve location data (e.g., coordinates in latitude and longitude) corresponding to the user's current location from a location database 140. The location server 106 may then provide the retrieved location data to the computing device 102 to be stored in the memory 122 as the location data 132. Subsequently, the mapping module 128 may process the location data 132 to display the user's current location on the map via the user interface 124. In other implementations, when determining the user's location on the map, the mapping software module 128 may first communicate with the map server 104 to request map data for the specified geographic area, and the location module 136 may then communicate with the location server 106 to retrieve the relevant location data. Once the computing device 102 receives the map data 130 and the location data 132, the mapping module 128 may process the map data 130 to display the map and the location data 132 to display the user's current location on the map. In still other implementations, the mapping software module 128 may first communicate with the map server 104 to retrieve map data from the map database 134, and the map server 14 may in turn communicate with the location server 106 to retrieve the necessary location data from the location database 140. The map server 104 may then provide the retrieved map data and the retrieved location data to the computing device 102 to be stored as the map data 130 and the location data 132, respectively.

To visualize the user's location on the map, the mapping software module 128 renders information in the location data 132 as a first graphic object. Further, the mapping module 128 may render an accuracy circle centered on the first graphic object. In some embodiments, the radius of the accuracy circle indicates the accuracy of the user's location on the map within a certain limit. To visualize the direction that the user is facing, the mapping software module 128 renders information from the compass module 138 (e.g., a compass direction) as a second graphic object that is immediately proximate to and visually separate from the first graphic object. The second graphic object may be positioned immediately outside the radius or outer perimeter of the first graphic object. The size and shape of the first and second graphic objects may be of any desired dimension and type, such as a circular dot, a square, an irregular shape, a triangle, an arrow, etc. By way of example only, the items 204 and 208 are shown in the form of a circular dot and a triangle or arrow in FIG. 2.

The second graphic object is oriented to point in the user's facing direction, and may be the same or a different color as the first graphic object. In an embodiment, the base edge of the second graphic object may be curved to match the circular shape of the first graphic object. In this scenario, the second graphic object resembles an arrow in which the angles of the two sides of the arrow farthest from the first graphic object are at (or less than) tangent to the curved edge of the first graphic object where the two sides, if extended, would meet the first graphic object. To ensure visibility of the second graphic object, the accuracy circle may not have a smaller radius than the tip of the second graphic object. Additionally or alternatively, the accuracy circle may disappear if the first graphic object and the second graphic object appear sufficiently distinct and visually balanced. Moreover, when viewing the map at a zoom level at which the user's facing direction is typically not useful, the second graphic object may disappear and the accuracy circle may shrink to disappear as well. In other embodiments, an elongated arrow or some other shape may be similarly positioned relative to the first graphic object to indicate the user's facing direction.

With continued reference to FIG. 1, the map server 104 may include a processor 150 and a memory 152 that stores a map request processor 154 that includes instructions that are executable on the processor 150. Similarly, the location server 106 may include a processor 156 and a memory 158 that stores a search request processor 160 including instructions executable on the processor 156.

For simplicity, FIG. 1 illustrates both the map server 104 and the location server 106 as only one instances of a server device. However, according to some implementations, the map server 104 and/or the location server 106 may include a group of one or more server devices, each equipped with one or more processors and capable of operating independently of the other server devices. For example, map server devices operating in such a group can process requests from the computing device 102 individually (e.g., based on availability), in a distributed manner where one operation associated with processing a request is performed on one map server device while another operation associated with processing the same request is performed on another map server device, or according to any other suitable technique. Further, the map server 104 and the location server 106 may be owned by a single business entity and located in a single geographic location (e.g., a server farm). Alternatively, the map server 104 and/or the location server 106 may be owned by different business entities and located across a number of geographic locations. For the purposes of this discussion, the term "map server" may refer to an individual map server device or to a group of two or more map server devices. Similarly, the term "location server" may refer to an individual location server device or to a group of two or more location server devices.

Figure 2:
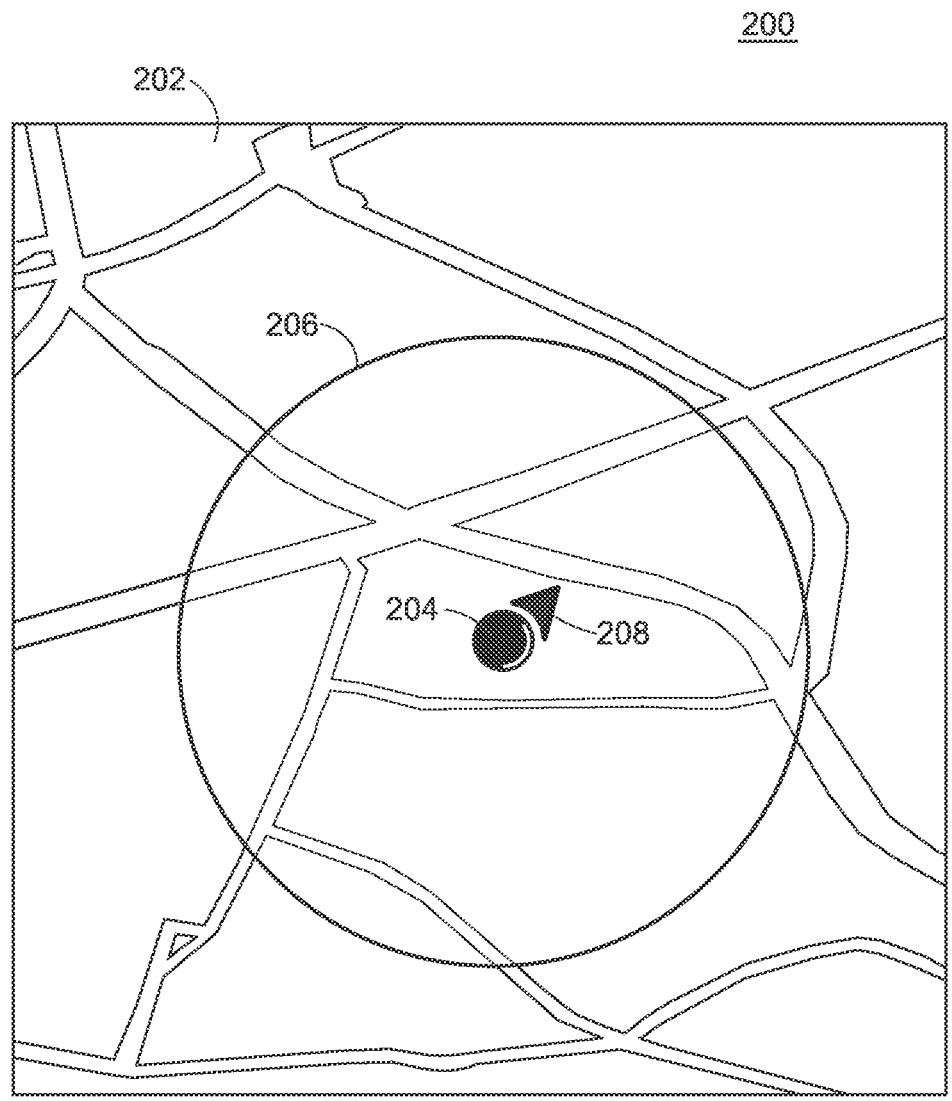
FIG. 2 is an example screenshot which a mapping application can generate to display a user's location and facing direction.

Referring now to FIG. 2, the mapping software module 128 may generate a screenshot 200 on a computing device (e.g., the computing device 102) that illustrates a digital map of a geographic area 202 along with an indication of the user's location and facing direction. In FIG. 2, the processor 120 executes an instruction of the mapping module 128 to display the user's location on the digital map 202 as a first graphic object 204. A large circle 206 centered on the first graphic object 204 represents the accuracy circle of the location estimation. The processor 120 also executes an instruction of the mapping module 128 to display the user's facing direction on the digital map 202 as a second graphic object 208, which is pointing in the compass direction that the user is facing. The user's facing direction is visualized separately from the user's location. In other words, the second graphic object 208 is related or proximate to, but not connected to, the first graphic object 204. For example, the second graphic object 208 rotates around the dot 204 to indicate changes in the direction that the client computing device or user is facing. However, when the user moves from one location to a new location, both the first graphic object 204 and the second graphic object 208 move along together to the new location to indicate the user's movement. Additionally, because the second graphic object 208 is not part of the first graphic object 204, the visualization is clear even in scenarios where the first graphic object 204 is moving in a different direction from the direction that the second graphic object 208 is facing. For example, the first graphic object 204 may be moving westward along a path to indicate the user's relative movement towards the west. However, the second graphic object 208 may be shown facing northward because the user is pointing the computing device towards the north.

Figure 3:
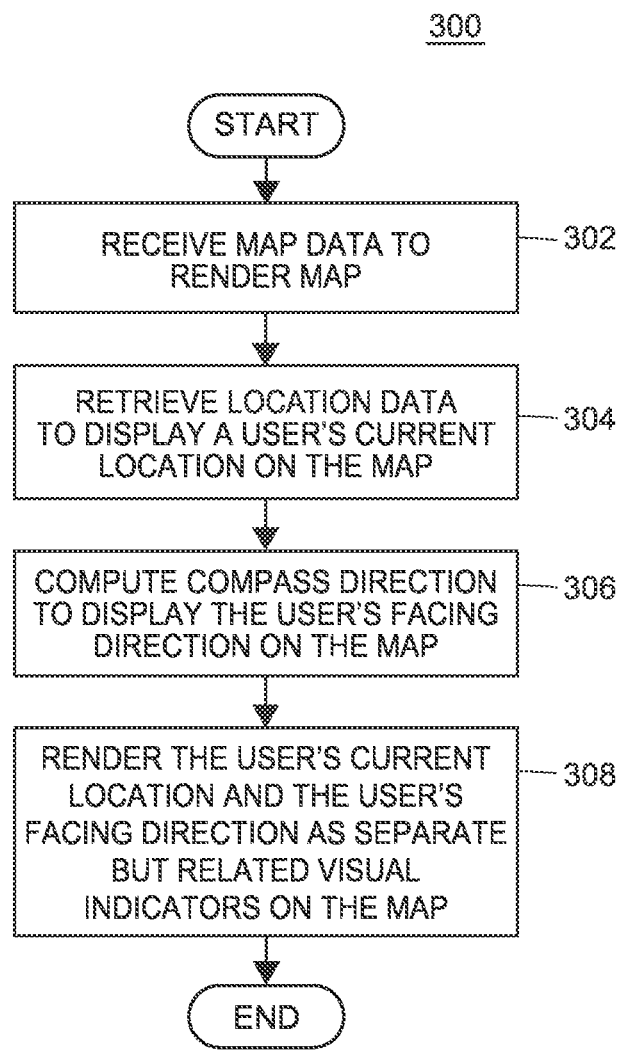
FIG. 3 is a flow diagram of an example method for displaying a user's location and facing direction.

To further illustrate the techniques for indicating the user's location and facing direction on a digital map, a processor 120 of the computing device 102 may execute instructions of the mapping software module to implement a method 300 (FIG. 3). In an example implementation, the method of FIG. 3 is implemented in the mapping software module 128 executed by the processor 120 of the computing device 102. More generally, however, the method can be implemented in any suitable software application or module (e.g., a browser plugin), and can be implemented as sets of instructions stored on a computer-readable medium and executable on one or more processors.

The flow diagram of FIG. 3 illustrates an example method 300 for providing an indication of a user's location and a compass direction that the user is facing on a map. At block 302, the processor 120 executes an instruction to render a digital map for a specified geographic area on a display of the computing device 102. For example, the computing device 102 may receive map data for the specified geographic area in response to sending a request to a map server 104 for map data 134. The request may include a geographic area having a plurality of geographic locations and a user location. The received map data may include map elements for the geographic area such as roads, buildings, bodies of water, etc. At block 304, the processor 120 may execute an instruction to retrieve location data corresponding to the user's current location and to process the retrieved data in order to display the user's current location on the map. The user's location may be determined based any number of location detection methods such as GPS, location of cell towers, Wi-Fi networks, etc. Next, at block 306, the processor 120 may execute an instruction to determine a compass direction corresponding to the user's facing direction in order to display the direction that the user is facing on the map. The method 300 may acquire the user's facing direction using a sensor/device on the computing device 102 that measures compass directions (e.g., a magnetometer). At block 308, the method 300 renders the user's current location and the user's facing direction as separate but related visual indicators on the map. For example, the user's location may be displayed as a first graphic object with a radius while the user's facing direction may be displayed an arrow positioned outside the radius of the circular dot. As the user moves from one location to another, the first graphic object and the second graphic object move together. However, the second graphic object may also rotate around the first graphic object as the facing direction of the user changes.

Using the system 100 and method 300 described herein, a user's location and facing direction may displayed as separate but related visual indicators on a digital map to provide a better and more intuitive visualization.

Figure 4:
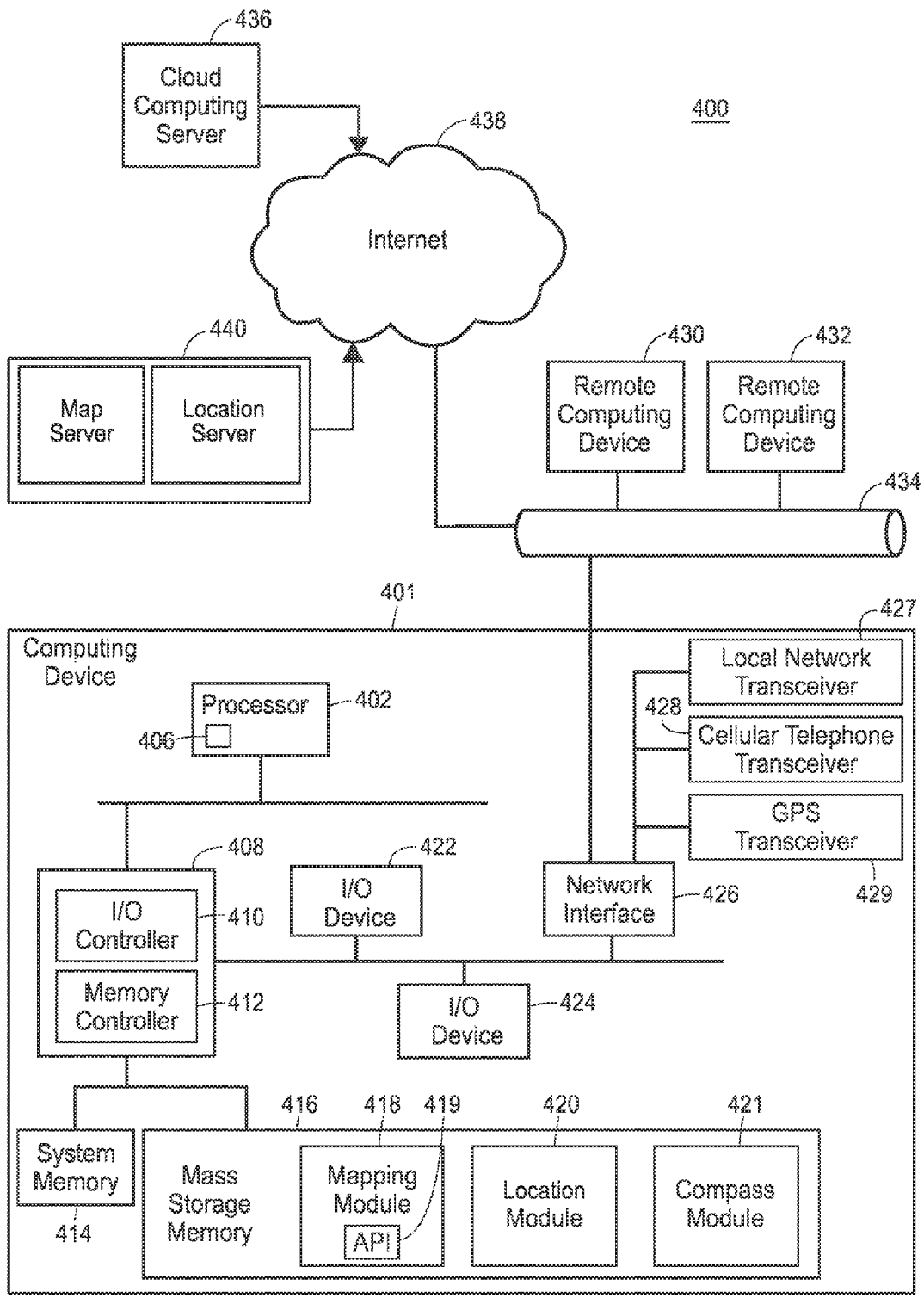
FIG. 4 is a block diagram of computing environment that implements a system and method for displaying a user's location and facing direction.

FIG. 4 is a high-level block diagram of an example computing environment for a mobile mapping system 400 having a computing device 401 that may be used to implement the method and systems described herein. The computing device 401 may include the computing device 102 (e.g., a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 400 may be used to implement and execute the example system of FIG. 1, the method of FIG. 3, and the like. Although the example mobile mapping system 400 is described below as including a plurality of peripherals, interfaces, chips, memories, etc., one or more of those elements may be omitted from other example processor systems used to implement and execute the example system 100 to display dynamic map content based on the user's location, scheduled task and preference. Also, other components may be added.

As shown in FIG. 4, the computing device 401 includes a processor 402 that is coupled to an interconnection bus 404. The processor 402 includes a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 is coupled to a chipset 408, which includes a memory controller 410 and a peripheral input/output (I/O) controller 412. As is well known, a chipset typically provides I/O and memory management functions as well as a plurality of general purpose and/or special purpose registers, timers, etc. that are accessible or used by one or more processors coupled to the chipset 408. The memory controller 410 performs functions that enable the processor 402 (or processors if there are multiple processors) to access a system memory 414 and a mass storage memory 416, that may include either or both of an in-memory cache (e.g., a cache within the memory 414) or an on-disk cache (e.g., a cache within the mass storage memory 416).

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement a mapping application 418 having an API 419, a location module 420, and a compass module 421. The mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the mobile mapping system 400. Thus, a module, block, function, operation, procedure, routine, step, and method can be implemented in hardware, firmware, and/or software. In one embodiment, program modules and routines (e.g., the mapping application 418, the API 419, the location module 420, the compass module 421, etc.) are stored in mass storage memory 416, loaded into system memory 414, and executed by a processor 402 or can be provided from computer program products that are stored in tangible computer-readable storage mediums (e.g., RAM, hard disk, optical/magnetic media, etc.).

The peripheral I/O controller 410 performs functions that enable the processor 402 to communicate with peripheral input/output (I/O) devices 422 and 424, a network interface 426, a cellular network transceiver 427, a local network transceiver 428, and a GPS transceiver 429 (via the network interface 426) via a peripheral I/O bus 428. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 422 and 424 may be used with the mapping application 418, the location module 420, and/or the compass module 421 to receive GPS data from the GPS transceiver 429, send the GPS data to the backend components of the system 100, render, and display maps and user interfaces as described in relation to the figures. A cellular telephone transceiver 427 may be resident with the local network transceiver 428. The local network transceiver 428 may include support for a Wi-Fi network, Bluetooth, Infrared, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 428 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The mobile mapping system 400 may also implement the mapping application 418, the location module 420, and the compass module 421 on remote computing devices 430 and 432. The remote computing devices 430 and 432 may communicate with the computing device 401 over an Ethernet link 434. For example, the computing device 401 may receive mapping data created by a mapping application executing on a remote computing device 430, 432. In some embodiments, the mapping application 418, the location module 420 and/or the compass module 421 may be retrieved by the computing device 401 from a cloud computing server 436 via the Internet 438. When using the cloud computing server 436, the retrieved mapping application 418, the location module 420 and/or the compass module 421 may be programmatically linked with the computing device 401. The mapping application 418, the location 420 and/or the compass module 421 may be a Java® applet executing within a Java® Virtual Machine (JVM) environment resident in the computing device 401 or the remote computing devices 430, 432. The mapping application 418, the location module 420 and/or the compass module 421 may also be "plug-ins" adapted to execute in a web-browser located on the computing devices 401, 430, and 432. In some embodiments, the mapping application 418 and/or the location module 420 may communicate with back end components 440 such as the map server 104 and the location server 106 via the Internet 438.

The system 400 may include but is not limited to any combination of a LAN, a MAN, a WAN, a mobile, a wired or wireless network, a private network, or a virtual private network. Moreover, while only three remote computing devices 430 and 432 are illustrated in FIG. 4 to simplify and clarify the description, it is understood that any number of client computers are supported and can be in communication within the system 400.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for displaying dynamic map content based on the user's location and application data for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process that displays the user's location and the user's facing direction on a mobile computing device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for indicating user location and compass direction on digital maps, the method comprising:
    requesting, by one or more processors, map data from a remote mapping system server using a client computing device, the request including a geographic area;
    receiving, by the one or more processors, the map data from the remote mapping system server at the client computing device in response to the request;
    determining, by the one or more processors, a user location and a user compass direction at the client computing device; and
    rendering a first graphic object to represent the user location and a second graphic object to represent the user compass direction, within a digital map of the geographic area at the client computing device, wherein as the user location changes, the first and second graphic objects move together within the digital map to indicate a changed user location and, as the user compass direction changes, the second graphic object moves relative to the first graphic object to indicate a changed compass direction.

2. The computer-implemented method of claim 1, including rendering an entirety of the second graphic object outside an outer perimeter of the first graphic object.

3. The computer-implemented method of claim 2, wherein as the user compass direction changes, the second graphic object moves around the perimeter of the first graphic object.

4. The computer-implemented method of claim 1, wherein the received map data includes data to represent one or more of a road, a building, and natural features corresponding to the geographic area.

5. The computer-implemented method of claim 1, further comprising determining the user location.

6. The computer-implemented method of claim 5, wherein the user location includes one or more of a global positioning system coordinate, a cellular signal tower triangulation, or an internet protocol (IP) address location.

7. The computer-implemented method of claim 1, wherein the user location corresponds to a current location of the client computing device.

8. The computer-implemented method of claim 1, wherein the user compass direction corresponds to a current orientation of the client computing device.

9. The computer-implemented method of claim 1, wherein determining the user compass direction at the client computing device comprises determining the user compass direction using a sensor at the client computing device.

10. The computer-implemented method of claim 9, wherein the sensor includes one or more of a magnetometer and an accelerometer.

11. The computer-implemented method of claim 1, further comprising:
  detecting a new user location and a new user compass direction at the client computing device; and
  rendering both the new user location and the new user compass direction within the digital map at the client computing device in response to detecting the new user location and the new user compass direction.

12. A non-transitory computer-readable medium having instructions stored thereon for indicating client computing device location and compass direction on digital maps, the instructions comprising:
  requesting map data from a remote mapping system server using a client computing device, the request including a geographic area;
  receiving the map data from the remote mapping system server at the client computing device in response to the request;
  determining a user location and a user compass direction at the client computing device; and
  rendering a first graphic object to represent the user location and a second graphic object to represent the user compass direction within a digital map of the geographic area at the client computing device, wherein as the user location changes, the first and second graphic objects move together within the digital map and, as the user compass direction changes, the second graphic object moves relative to the first graphic object to indicate a changed compass direction.

13. The non-transitory computer-readable medium of claim 12, wherein an entirety of the second graphic object is positioned outside an outer perimeter of the first graphic object.

14. The non-transitory computer-readable medium of claim 13, wherein as the user compass direction changes, the second graphic object moves around the perimeter of the first graphic object.

15. A computer system for indicating user location and compass direction on digital maps, the computer system comprising:
  one or more processors;
  one or more memories storing a plurality of instructions for execution on the one or more processors, the instructions including:
    requesting map data from a remote mapping system server using a client computing device, the request including a geographic area;
    receiving the map data from the remote mapping system server at the client computing device in response to the request;
    determining a user location and a user compass direction at the client computing device; and
    rendering a first graphic object to represent the user location and a second graphic object to represent the user compass direction, within a digital map of the geographic area at the client computing device, wherein as the user location changes, the first and second graphic objects move together within the digital map to indicate a changed user location and, as the user compass direction changes, the second graphic object moves relative to the first graphic object to indicate a changed compass direction.

16. The computer system of claim 15, wherein an entirety of the second graphic object is outside an outer perimeter of the first graphic object, and as the user compass direction changes, the second graphic object moves around the perimeter of the first graphic object.

17. The computer system of claim 15, wherein the received map data includes data to represent one or more of a road, a building, and natural features corresponding to the geographic area.

18. The computer system of claim 15, wherein the plurality of instructions further include determining the user location, wherein the user location includes one or more of a global positioning system coordinate, a cellular signal tower triangulation, or an internet protocol (IP) address location.

19. The computer system of claim 15, wherein the user location corresponds to a current location of the client computing device and the user compass direction corresponds to a current orientation of the client computing device.

20. The computer system of claim 15, wherein the instruction for determining the user compass direction at the client computing device further includes determining the user compass direction using a sensor at the client computing device, the sensor including one or more of a magnetometer and an accelerometer.

* * * * *